May 30, 1967    R. GERRETZ    3,321,958
TUBE TESTING PRESS
Filed Sept. 14, 1964
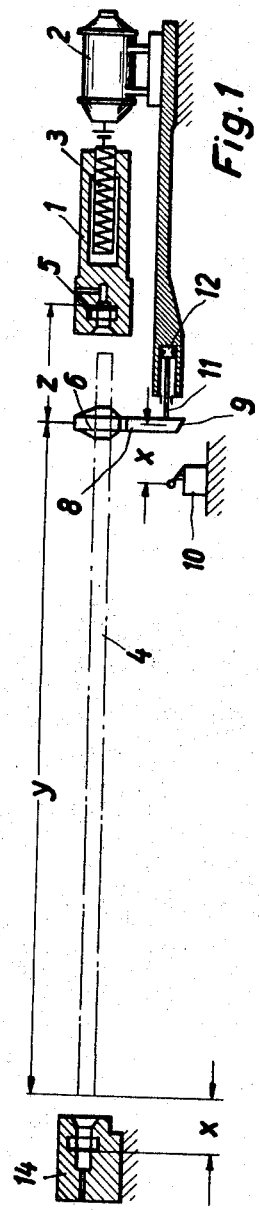
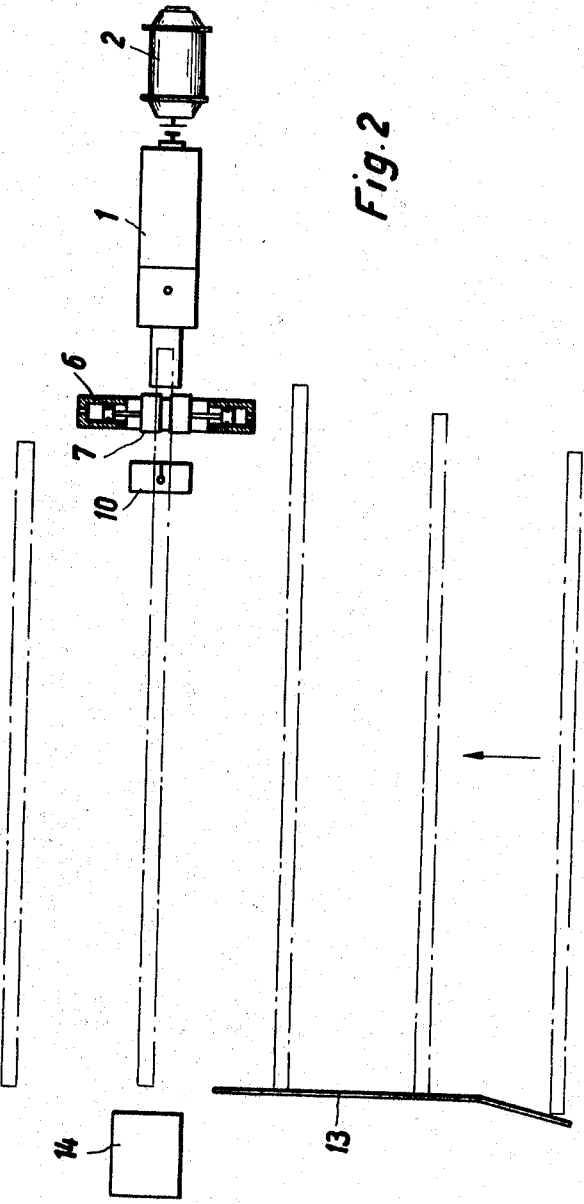
Inventor:
Richard Gerretz,
By Ernest A. Marmorek,
His Attorney.

`3,321,958`
TUBE TESTING PRESS
Richard Gerretz, Suchteln, Germany, assignor to Mannesmann-Meer Aktiengesellschaft, Monchen-Gladbach, Germany
Filed Sept. 14, 1964, Ser. No. 396,135
Claims priority, application Germany, Sept. 12, 1963, M 58,161
4 Claims. (Cl. 73—49.5)

The invention relates to a tube testing press, and relates more particularly to a tube testing press of the type used for the testing of tubes of different lengths.

In the testing of tubes, the tubes to be tested are usually either first elevated to the testing plane and then placed in position laterally, or are positioned by means of special elevators. The elevators often include clamps for holding the tube during the testing procedure. The testing is carried out by two testing heads which are positioned axially of the tube, and either the two heads are movable, or one head is movable and the other fixed.

Equipment of this type, particularly where one of the testing heads is movable and the other fixed has, however, given rise to severe tube damages during the testing. In particular, owing to the great lengths of tubes tested, the engagement of the tubes between the movable and fixed testing heads has resulted in buckling damages to the tubes, often of a permanent nature. These damages are wasteful of time and material.

It is accordingly among the principal objects of the invention to provide a testing press which will preclude buckling damage to the tubes during testing.

It is another object of the invention to provide a testing press in which the buckling length during movement of the movable head engaging one end of the tube, is considerably reduced.

It is a further object of the invention to provide a testing press in which the tube is moved into the fixed head without any abutment impact therein.

With the above and other objects of the invention in view, the invention consists in the novel construction, arrangement and combination of various devices, elements and parts, as set forth in the claims hereof, one embodiment of the same being illustrated in the acompanying drawings and described in the specification.

For a fuller understanding of the nature and objects of the invention, reference should be had to the following detailed description, taken in connection with the accompanying drawings, in which:

FIG. 1 is a schematic vertical sectional view of a tube testing press in accordance with the invention; and FIG. 2 is a schematic plan view, partly in section, of the press shown in FIG. 1.

In carrying the invention into effect in one of the embodiments which has been selected for illustration in the accompanying drawings and for description in this specification, and referring now particularly to FIG. 1, there is provided a testing press that comprises in a test stand a movable head 1 and a fixed head 14. The movable head 1 is movable in opposite directions (left and right, FIG. 1) axially of a tube 4. The head 1 may be so moved either hydraulically or, for instance, by means of an electric motor 2 and a threaded spindle 3 driven by the motor 2.

When the motor 2 is energized, the movable testing head 1 will be moved, by the spindle 3, in a direction towards the tube 4 (to the left, FIG. 1) until an abutment surface 5 inside the head 1 will abut the right end of the tube 4.

At a distance $z$ from the abutment surface 5, in the inactive position of the head 1, there is arranged a movable support means 6 that has clamps 7 which are operable by well-known suitable actuating means (not shown) to clamp releasably the tube 4 tightly.

The support means 6 is movable axially of the tube 4 in opposite directions, and carries a lug 8 which has an oblique surface 9. When the support means 6 is moved to the left (FIG. 1), the surface 9 will trip a limit switch 10, after the support means 6 has covered a distance $x$. The limit switch 10, which is of well-known suitable construction, is disposed in the path of the lug 8, so as to permit the aforesaid tripping of the limit switch 10 by the oblique surface 9 of the lug 8; the limit switch is so arranged in circuit (not shown) as to stop the motor 2 when tripped.

The support means 6 furthermore carries a piston rod 11 of a pressure cylinder 12. The arrangement of the pressure cylinder 12 is such that the piston rod 11 and therewith the support means 6, is urged by the pressure of the cylinder 12 at all times in one axial direction, namely towards the right in FIG. 1. The pressure medium for the cylinder 12 may be a liquid, or a compressible fluid, or a compression spring.

As best shown in FIG. 2, the tubes 4 to be tested, before they reach the test station, are guided by a position guide 13 that positions each tube to have its other end (the left end, FIG. 1) at a predetermined distance from a fixed testing head 14. The distance is so chosen that said other end of the tube 4 will be spaced from its position when it is engaged in the fixed head 14 for the same aforesaid distance $x$. By this arrangement, the length of the path of insertion of the tube 4 into the fixed head 14 is always the same, namely equals the distance $x$.

The operation of the above described embodiment is as follows:

As the successive tubes 4 approach the test stand, each tube 4 is positioned laterally by the positioning guide 13 so that its other end will be spaced from the head 14 for a predetermined distance, namely from its later position in the fixed head 14 for the distance $x$.

Thereafter, the tube 4 will be clamped by the clamps 7 of the support means 6 at a distance $z$ from the surface 5 at standstill of the head 1. The position of the support means 6 is such that it will divide the tube 4 into portions of materially unequal lengths, of which the longer portion has the length $y$. Owing to the connection of the support means 6 to the pressure cylinder 12, the aforesaid clamping by the clamps 7 will hold the tube 4 axially immovable. As previously mentioned, the lug 8 of the support means 6 is in that position spaced from the limit switch 10 for the same distance $x$.

Thereafter, the movable head 1 will be moved axially of the tube 4, in the direction from the movable to the fixed head (to the left, FIG. 1), and will telescope over the right end of the tube 4. In this position, the tube 4 is subjected to axial pressure, but only between the support means 6 and the movable head 1, which is such a small distance, having a maximum length $z$, so as to preclude any buckling of the tube 4.

Gradually, the abutment surface 5 will reach the right end edge of the tube 4 and will make abutment contact with it. Continued movement to the left by the movable head 1 will push the tube in the same direction (to the left, FIG. 1), throughout the distance $x$, until the oblique surface 9 trips the limit switch 10.

During the movement of the tube 4 throughout the distance $x$ to the left (FIG. 1), the tube 4 has taken along the support means 6, against resistance exerted by the pressure cylinder 12.

During this movement, furthermore, the other end (the left end, FIG. 1) of the tube 4 has telescoped into the fixed head 14 without, however, making any abutment contact therein, as the limit switch 10 upon tripping has operated to discontinue the movement to the left of the movable head 1 and thereby also of the tube 4.

This arrangement prevents buckling of the long tube portion $y$, as here the only resistance to be overcome by the left end of the tube 4 is that of the friction between the tube and the bore surface of the fixed head 14.

After the testing, the movable head 1 will be moved by the motor 2 in the opposite direction (to the right, FIG. 1), until it reaches its initial position. During this return movement of the head 1, the pressure cylinder 12 will move the tested tube 4 in the same direction (to the right, FIG. 1) to remove the tube 4 from its engagement in the fixed head 14.

Thereafter, the clamps 7 of the support means 6 will release the tube 4, and the latter be removed from the test stand.

Certain of the advantages of the invention have already been herein referred to. It may be useful, however, to allude particularly at this point to the following advantages:

(a) The tube 4 is held immovable by the support means 6 at the commencement of the engagement of the tube 4 by the movable head 1;

(b) the buckling length $z$ is so small that no buckling will take place;

(c) the controlled distance $x$ of immission of the tube 4 into the fixed head 14 is so dimensioned that no abutment impact takes place, so that there will be no buckling of the longer portion $y$ of the tube 4; and (d) the support means 6 furthermore operates to pull the tube 4 out of the fixed head 14 after the test has been completed.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a testing press, for use in testing tubes of different lengths at a test stand, the combination of, a fixed testing head, a movable testing head in axial alignment with said fixed head at said test stand and being axially movable for releasably engaging a tube between the testing heads, guide means operable for positioning the tube to be tested in said test stand, support means operable for supporting the tube in said test stand at one point between its ends thereby dividing the tube into two portions of unequal lengths and comprising means releasably clamping the tube, one of said lengths extending between said support means and said movable head being sufficiently small to preclude buckling of the tube, said support means being displaceable axially in opposite directions with the tube and offering resistance against being displaced in a direction from said movable towards said fixed head, said movable head being operable to move in one axial direction from the movable head towards the fixed head first to engage one end of the tube and thereafter to move the tube and said support means in said one direction to engage the other end of the tube in the fixed support, a limit switch operable to terminate the movement of said movable head in said one direction and being disposed in the path of said support means when said support means moves in said one direction, whereby said support means will operate said limit switch to terminate at predetermined position said movement of the tube in the one direction.

2. In a testing press, as claimed in claim 1, and a pressure cylinder connected to said support means and operable for exerting thereon at all times axial pressure directed in the opposite of said axial directions, thereby resisting movement in said one direction, and urging said support into said opposite direction.

3. In a testing press, as claimed in claim 1, and a positioning guide disposed near the other tube end for positioning the other tube end at a predetermined distance from said fixed axial head during its transit to testing position.

4. In a testing press, as claimed in claim 3, said positioning guide placing the tube in such a manner that its other end will be spaced from its position of engagement by the fixed testing head for a predetermined distance, said support means and limit switch being spaced from each other for said predetermined distance.

References Cited
UNITED STATES PATENTS

| 2,242,658 | 5/1941 | Protin | 73—49.6 |
| 2,805,569 | 9/1957 | Billen et al. | 73—49.5 |

LOUIS R. PRINCE, *Primary Examiner.*

WILLIAM A. HENRY II, *Assistant Examiner.*